(12) United States Patent
Derr et al.

(10) Patent No.: US 8,155,895 B2
(45) Date of Patent: Apr. 10, 2012

(54) METHOD AND SYSTEM OF DETECTING LIQUID IN AN ACOUSTIC FLOW METER

(75) Inventors: Charles W. Derr, Spring, TX (US);
Henry Charles Straub, Jr., Sugar Land, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 931 days.

(21) Appl. No.: 12/169,175

(22) Filed: Jul. 8, 2008

(65) Prior Publication Data
US 2010/0010756 A1    Jan. 14, 2010

(51) Int. Cl.
*G01F 1/00* (2006.01)
(52) U.S. Cl. .......................................... 702/48
(58) Field of Classification Search ............ 702/48, 702/100
See application file for complete search history.

(56) References Cited

U.S. PATENT DOCUMENTS

| | | | |
|---|---|---|---|
| 6,209,388 B1 | 4/2001 | Letton | |
| 6,386,018 B1 * | 5/2002 | Letton et al. | 73/61.79 |
| 6,769,293 B2 | 8/2004 | Zanker | |
| 7,373,808 B2 | 5/2008 | Zanker | |
| 2002/0078737 A1 | 6/2002 | Zanker | |
| 2003/0121335 A1 | 7/2003 | Liu | |
| 2004/0011141 A1 | 1/2004 | Lynnworth | |
| 2007/0039399 A1 | 2/2007 | Groeschel | |

OTHER PUBLICATIONS

Klaus J. Zanker, Diagnostic Ability of the Daniel Four-Path Ultrasonic Flow Meter, Daniel Industries, USA, Published more than one year before the filing date of the application.
International Search Report and Written Opinion for application—PCT/US2009/041129, dated Nov. 17, 2009.

* cited by examiner

*Primary Examiner* — Drew A Dunn
*Assistant Examiner* — Stephen Cherry
(74) *Attorney, Agent, or Firm* — Mark E. Scott; Conley Rose, P.C.

(57) ABSTRACT

Detecting liquid in an acoustic flow meter. At least some of the illustrative embodiments are methods including flowing a gaseous substance through a central passage of a meter body, sending acoustic signals along respective chordal pathways across the central passage (none of the chordal pathways intersect a lower portion of the central passage where liquid, if present during flow of the gaseous substance, accumulates), calculating a flow velocity of the gaseous substance proximate to each chordal pathway based on transit times of the acoustic signals along the respective chordal pathways, and determining the presence of a liquid accumulated in the lower portion based on the flow velocity proximate to each chordal pathway.

11 Claims, 6 Drawing Sheets

US 8,155,895 B2

METHOD AND SYSTEM OF DETECTING LIQUID IN AN ACOUSTIC FLOW METER

CROSS REFERENCE TO RELATED APPLICATIONS

None.

BACKGROUND

After natural gas has been removed from the ground, the gas stream is transported from place-to-place via pipelines. It is desirable to know with accuracy the amount of gas flowing in the stream, and particular accuracy is demanded when the fluid is changing hands, or "custody transfer." Ultrasonic flow meters may be used to measure the amount of natural gas flowing in a pipeline, and ultrasonic flow meters have sufficient accuracy to be used in custody transfer.

In an ultrasonic flow meter, acoustic signals are sent back and forth across the gas stream to be measured. Based on parameters of received acoustic signals, the gas flow velocity at several distinct elevations in the flow meter is determined. Based on the flow velocities and the known cross-sectional area of the flow meter, the gas flow volume may be calculated.

However, in some cases liquids accumulate in the lower portion of the flow meters measuring natural gas stream. The liquids may be hydrocarbons or water. For example, depending on pressure and dew point, hydrocarbons may precipitate out of the natural gas stream, causing liquid accumulations. As yet another example, pipelines may be hydrostatically tested by filling the lines with water, and in some cases the water is not fully removed before the pipeline carries natural gas. Regardless of the nature of the liquid, liquid accumulations reduce the cross-sectional area of the flow meter, and the reduced cross-sectional area has double effect on flow volume measurements. For a constant actual flow volume through a meter, a reduced cross-sectional area results in increased measured flow velocity. Moreover, the flow meter assumes a cross-sectional area, and determines a flow volume based on measured flow velocity and cross-sectional area. Liquid accumulations reduce the actual cross-sectional area, and thus actual volumes will be less than measured volumes based both on the reduced cross-sectional area and the tendency for the gas flow velocity to increase in the presence of the reduced cross-sectional area.

Some related art ultrasonic flow meters attempt to determine whether liquid has accumulated in the flow meter by way of a transducer pair that directs acoustic signals toward the lower-most portion of the meter. When no liquid is present, an acoustic signal created by one transducer traverses the meter, reflects from the lower-most portion of the meter, and then propagates to the second transducer. However, when liquid is present, the acoustic signal intersects and reflects from the surface of the liquid, rather than the lower-most portion of the meter, and thus the path length for the acoustic signal changes. Parameters of the acoustic signal indicate the changed path length, and thus the presence of liquid. However, a dedicated transducer pair used for liquid detection increases the cost and complexity of the flow meter, and retrofitting existing meters (whose acoustic signals traverse the flow meter substantially horizontally), though theoretically possible, is prohibitively expensive. Thus, systems and methods to determine whether liquid is present in acoustic meters would be beneficial.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
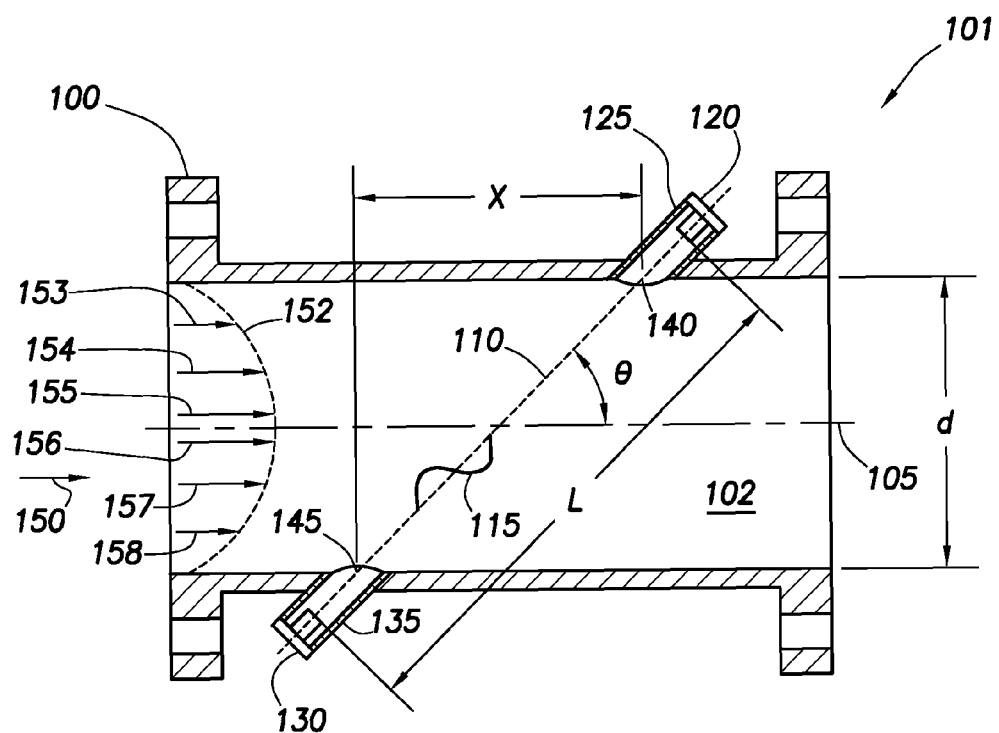
FIG. 1A shows a cross-sectional overhead view of a flow meter in accordance with at least some embodiments.

The various embodiments are directed to methods and systems of determining whether liquid has accumulated in a lower portion of a central passage of an acoustic-type flow meter. The determination is based on parameters of acoustic energy sent through the meter between transducer pairs, but where the acoustic energy does not intersect the liquid. FIG. 1A shows a cross-sectional overhead view of an acoustic flow meter 101 in order to explain the various components and relationships. A meter body or spool piece 100, suitable for placement between sections of a pipeline, has a predetermined size and defines a central passage 102 through which a measured gas (e.g., natural gas) flows. An illustrative pair of transducers 120 and 130, and their respective housings 125 and 135, are located along the length of spool piece 100. Transducers 120 and 130 are acoustic transceivers, and more particularly ultrasonic transceivers, meaning that they both generate and receive acoustic energy having frequencies of above about 20 kilohertz. The acoustic energy is generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by acoustic energy (i.e., the acoustic signal and other noise signals), the receiving piezoelectric element vibrates and generates an electrical signal that is detected, digitized, and analyzed by electronics associated with the meter.

A path 110, sometimes referred to as a "chord" or a "chordal pathway", exists between illustrative transducers 120 and 130 at an angle θ to a centerline 105. The length of chord 110 is the distance between the face of transducer 120 and the face of transducer 130. Points 140 and 145 define the locations where acoustic signals generated by transducers 120 and 130 enter and leave gas flowing through the spool piece 100 (i.e., the entrance to the spool piece bore). The position of transducers 120 and 130 may be defined by the angle θ, by a first length L measured between transducers 120 and 130, a second length X corresponding to the axial distance between points 140 and 145, and a third length "d" corresponding to the pipe inside diameter. In most cases distances d, X and L are precisely determined during meter fabrication. Further, transducers such as 120 and 130 are placed a specific distance from points 140 and 145, respectively, regardless of meter size (i.e., spool piece size). A gas, (e.g., natural gas) flows in a direction 150 with a flow velocity profile 152. Velocity vectors 153-158 illustrate that in some cases the gas velocity through spool piece 100 increases toward the centerline 105 of the spool piece 100.

Initially, downstream transducer 120 generates an acoustic signal that propagates across the fluid in the spool piece 100, and is then incident upon and detected by upstream transducer 130. A short time later (e.g., within a few milliseconds), the upstream transducer 130 generates a return acoustic signal that propagates back across the fluid in the spool piece 100, and is then incident upon and detected by the downstream transducer 120. Thus, the transducers 120 and 130 play "pitch and catch" with acoustic signals 115 along chordal path 110. During operation, this sequence may occur thousands of times per minute.

The transit time of the acoustic signal 115 between transducers 120 and 130 depends in part upon whether the acoustic signal 115 is traveling upstream or downstream with respect to the gas flow. The transit time for an acoustic signal traveling downstream (i.e., in the same direction as the gas flow) is less than its transit time when traveling upstream (i.e., against the gas flow). The upstream and downstream transit times can be used to calculate the average flow velocity of the gas along and/or proximate to the chord, and the transit times can be used to calculate speed of sound in the measured gas.

Figure 1B:
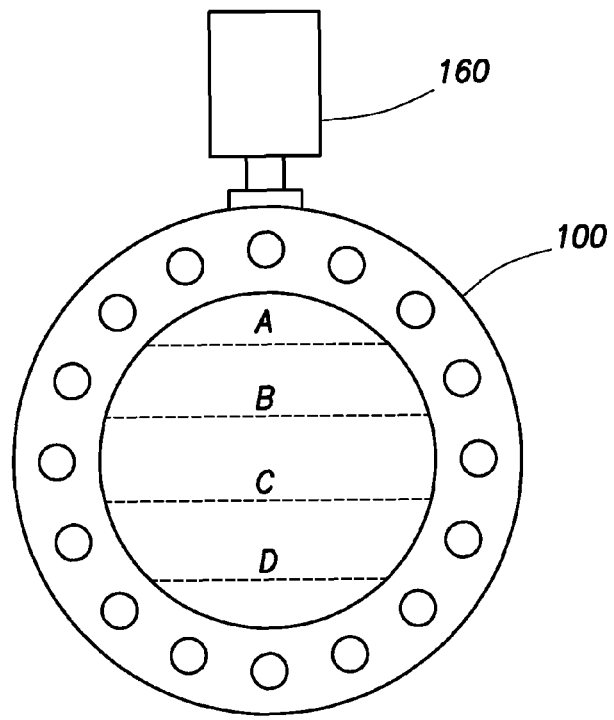
FIG. 1B shows an elevation end-view of a flow meter in accordance with at least some embodiments.

Acoustic flow meters can have one or more chords. FIG. 1B illustrates an elevational end view of one end of a multi-path acoustic flow meter. The flow meter of FIG. 1B comprises four chordal pathways A, B, C and D at varying levels within the spool piece 100. In particular, chord A is an upper-most chord, chord B is an upper-middle chord, chord C is the lower-middle chord, and chord D is the lower-most chord. Inasmuch as the concern of this specification is detection of liquids that accumulate, under the force of gravity, in a lower-most portion of a flow meter, the elevation designations upper and lower, and the variants, are in reference to gravity. Each chordal path A-D corresponds to a transducer pair behaving alternately as a transmitter and receiver. Also shown is control electronics enclosure 160, within which control electronics reside that acquire and process the data from the illustrative four chordal pathways A-D. Hidden from view in FIG. 1 B, because of the flange, are the four pairs of transducers and transducer ports that correspond to chordal pathways A-D.

Figure 1C:
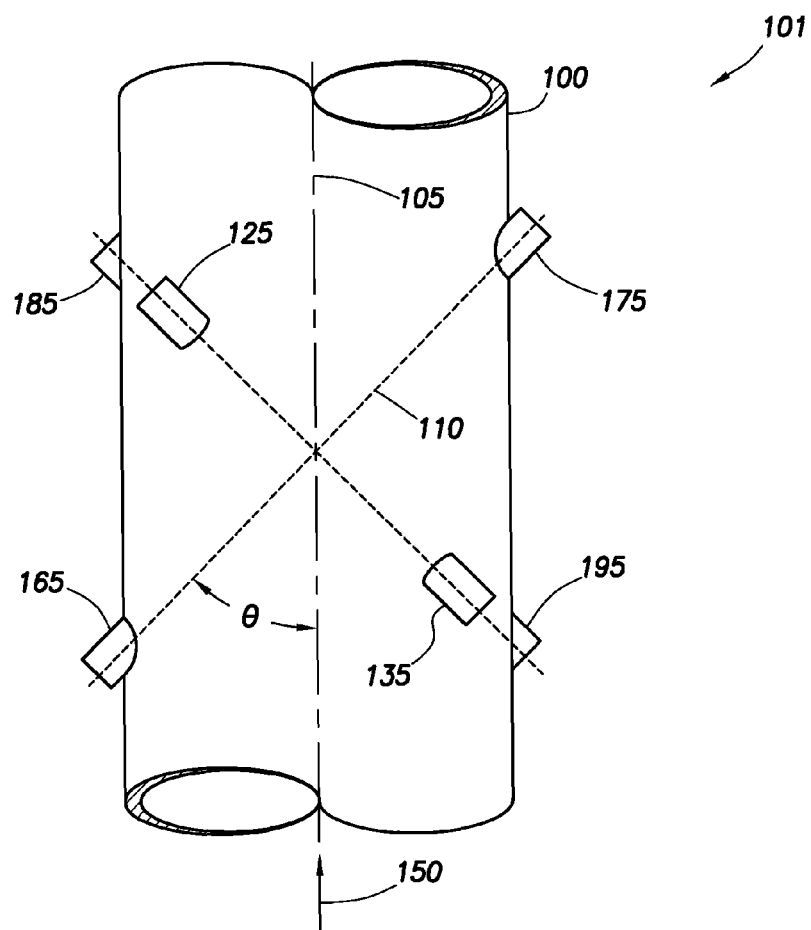
FIG. 1C shows an overhead view of a flow meter in accordance with at least some embodiments.
Figure 5A:
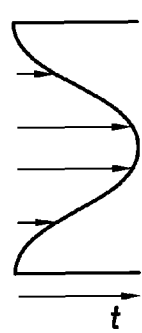
FIGS. 5A-5E show fluctuations of a flow velocity profile.
Figure 5B:
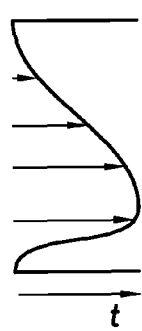
Figure 5C:
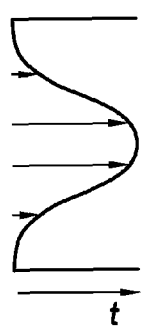
Figure 5D:
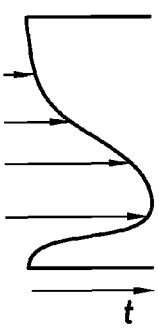
Figure 5E:
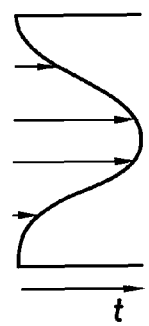

FIG. 1C shows an overhead view of the flow meter 101 to illustrate another aspect of the relationship of the chordal pathways. A first pair of transducer ports 125 and 135 (which may correspond to the upper-most chord, chord A) comprises transducers which define a chordal pathway at a non-perpendicular angle θ to centerline 105 of spool piece 100. Another pair of transducer ports 165 and 175 (which may correspond to upper-middle chord, chord B) comprises transducers which define a chordal pathway that loosely forms the shape of an "X" with respect to the chordal pathway of transducer ports 125 and 135. Similarly, a third pair of transducer ports 185 and 195 (which may correspond to the lower-middle chord, chord C) likewise comprises transducers which define a chordal pathway parallel to the chordal pathway for transducer ports 125 and 135, but lower in the central passage than the chordal pathway for either transducer ports 125 and 135 or transducer ports 165 and 175. Not explicitly shown in FIG. 1C, because of the curvature of the illustrative spool piece 100, is a fourth pair of transducer ports (which may correspond to the lower-most chord, chord D) that comprises transducers which define a chordal pathway parallel to the chordal pathway for transducer ports 165 and 175.

Taking FIGS. 1B and 1C together, the pairs of transducers are arranged such that the upper two pairs of transducers corresponding to chords A and B form an the shape of an "X", and the lower two pairs of transducers corresponding to chords C and D also form the shape of an "X". The flow meter determines the velocity of the gas proximate to each chord A-D to obtain chordal flow velocities, and the chordal flow velocities are combined to determine an average flow velocity across the entire central passage. From the average flow velocity and the cross-sectional area of the central passage, the amount of gas flowing in the spool piece, and thus the pipeline, may be determined.

Figure 2:
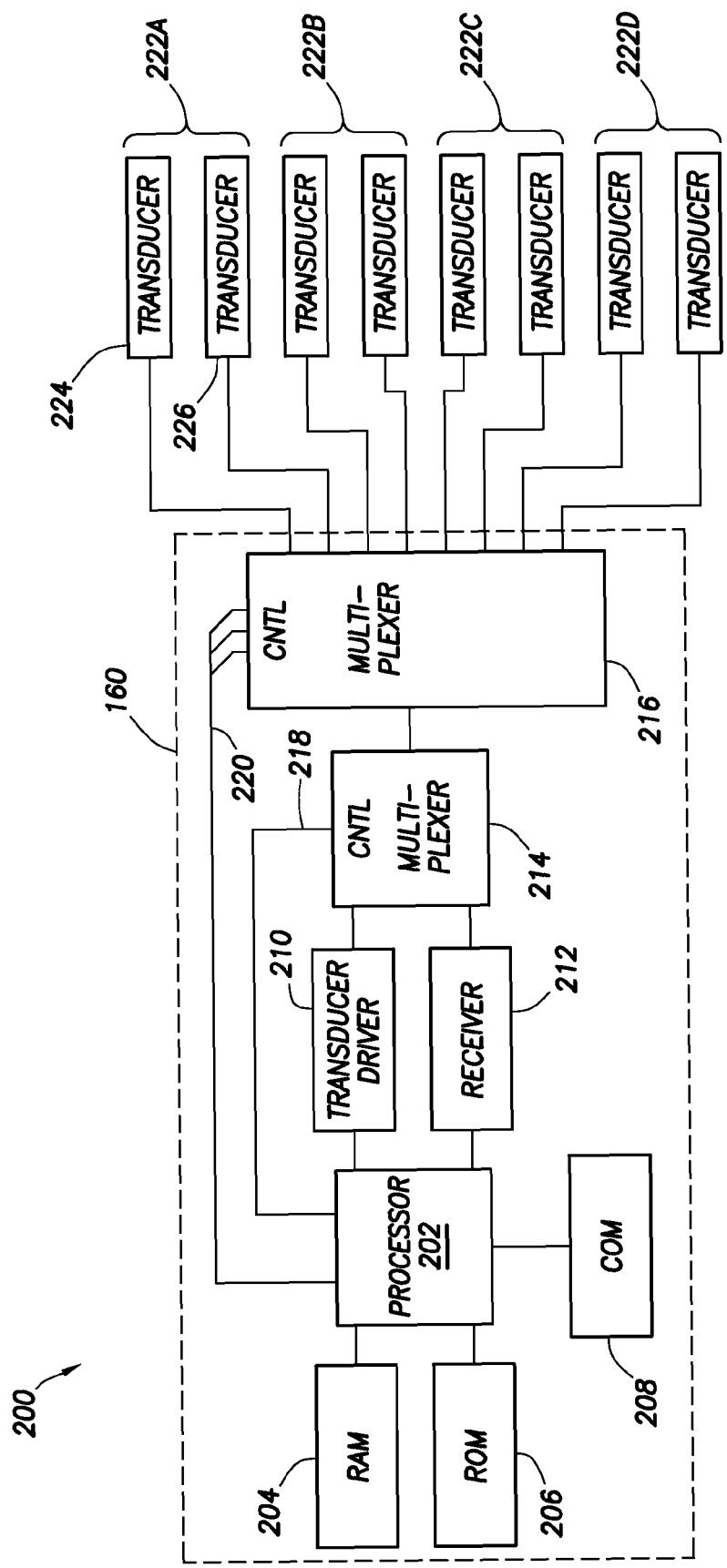
FIG. 2 shows electronics of a flow meter in accordance with at least some embodiments.

FIG. 2 illustrates control electronics 200 of an acoustic flow meter in accordance with at least some embodiments. The control electronics 200 may reside with the electronics enclosure 160 of FIG. 1B, which electronics enclosure 160 may couple to the spool piece 100. Alternatively, the electronics enclosure 160 may be equivalently mounted proximate (i.e., within a few feet) of the spool piece. The control electronics 200 comprise a processor 202 coupled to a random access memory (RAM) 204, read only memory (ROM) 206 and communication port (COM) 208. The processor 202 is the device within which programs execute to perform the tasks of the various embodiments. The ROM 206 is a non-volatile memory which stores operating system programs, as well as programs to implement the various embodiments. The RAM 204 is the working memory for the processor 202, and before execution some programs and/or data structures may be copied from the ROM 206 to the RAM 204. In alternative embodiments, programs and data structures may be accessed directly from the ROM 206. The communication port 208 is the mechanism by which the meter communicates with other devices, such as flow computers (which may accumulate measured flow volumes from a plurality of flow meters) and/or a data acquisition system. While the processor 202, RAM 204, ROM 206 and communication port 208 are illustrated as individual devices, in alternative embodiments microcontrollers are used, which microcontrollers integrally comprise a processing core, RAM, ROM and communication ports.

Processor 202 further couples to and controls a plurality of devices in order to send and receive acoustic signals through the measured gas. In particular, the processor 202 couples to a transducer driver 210, receiver 212, and two multiplexers 214 and 216 by way of control lines 218 and 220, respectively. In some embodiments, the transducer driver 210 comprises an oscillator circuit and an amplifier circuit. In embodiments in which the transducer driver 210 has an internal oscillator, the transducer driver 210 creates an initial signal, amplifies the signal to sufficient signal strength to drive a transducer, and provides impedance matching with respect to the transducers. In other embodiments, the transducer driver receives an alternating current (AC) signal of the desired frequency from the processor 202, amplifies the signal and provides impedance matching with respect to the transducers. The receiver 212 likewise may take many forms. In some embodiments, the receiver 212 is an analog-to-digital converter which takes the analog waveform created by a transducer representative of the received acoustic energy, and converts the signal to digital form. In some cases, the receiver 212 may filter and/or amplify the signals prior to or after digitization. The digitized version of the received signal may then pass to the processor 202 for purposes of determining gas flow, and also for determining whether liquid has accumulated in the flow meter (discussed more below).

The processor 202, executing a program, selectively controls the multiplexers 214 and 216 to couple each transducer of each transducer pair 222 to the transducer driver 210 (to drive the transducer to create the acoustic signal) and to the receiver 212 (to receive the electrical signal created by the transducer in response to the acoustic energy). In some embodiments, the processor 202, within the span of an illustrative one second measurement period, directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 2, and focusing particularly on transducer pair 222A as representative of all the transducer pairs 222. For purposes of this discussion, transducer 224 is the sending transducer, and transducer 226 is the receiving transducer; however, in actual operation these roles change alternately. Under control of the processor 202, the transducer driver 210 is coupled, through multiplexers 214 and 216, to the transducer 224. An electrical signal generated and/or amplified by the transducer driver 210 propagates to and excites a piezoelectric element in transducer 224, and in turn transducer 224 generates an acoustic signal. The acoustic signal traverses the distance between transducer 224 and transducer 226 in the measured gas. For convenience of the drawing, the transducer pair 222A of FIG. 2 is not aligned, but in operation the transducer pair would be substantially coaxial, as illustrated in FIG. 1A. During the flight time of the acoustic signal between transducer 224 and transducer 226, the processor 202 changes the configuration of the multiplexers 214 and 216 to couple transducer 226 to the receiver 212. Transducer 226 receives the acoustic energy (i.e., acoustic signal and noise signals), and an electrical signal corresponding to the received acoustic energy propagates to the receiver 212.

Though undesirable, in some situations liquids gather in the lower-most portion of a flow meter when a measured gas (e.g., natural gas) flows through the flow meter. The liquids may be hydrocarbons precipitated from the flowing gas, hydrocarbons introduced from upstream devices (e.g., compressor lubricating oils), water left over from hydrostatic testing, or liquids from other sources. Regardless of the source, liquid accumulations in the flow meter decrease the cross-sectional area of meter, which causes gas flow increases (for constant volume flows) and corresponding flow volume computation errors (based on both the increased flow velocity and reduced cross-sectional area). The various embodiments are directed to detecting the presence of liquid accumulations indirectly. That is, rather than having a dedicated pair of transducers whose chordal pathway intersects the surface of the liquid (if present), the various embodiments detect liquid based on parameters detected from chordal pathways that reside above, and do not intersect, a horizontal plane defined by the surface of liquid accumulations in the flow meter.

Figure 3:
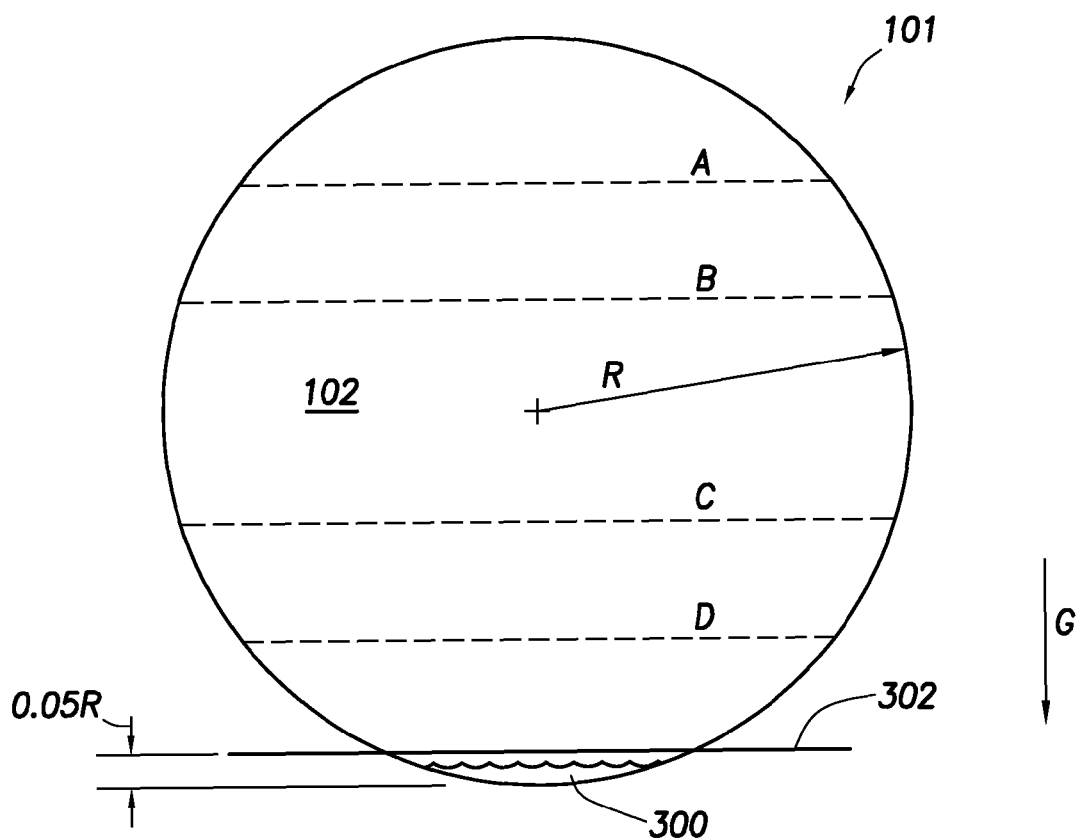
FIG. 3 shows an elevation end-view of a flow meter in accordance with at least some embodiments.
Figures 4A, 4B, 4C, 4D, 4E:
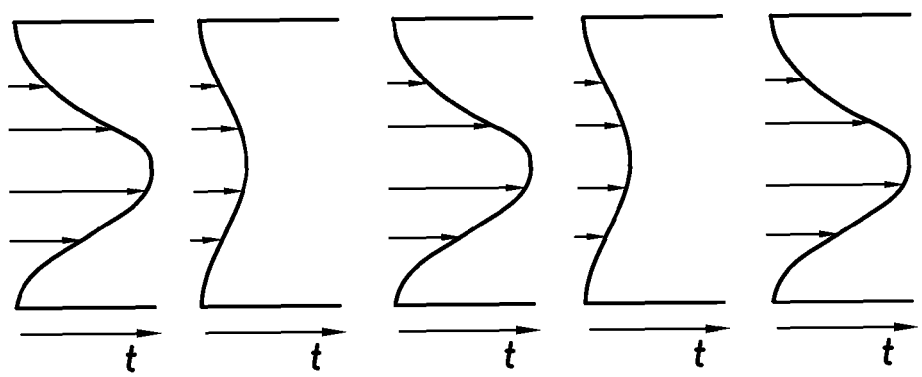
FIGS. 4A-4E show fluctuations of a flow velocity profile.

FIG. 3 illustrates an elevation end-view of a flow meter 101 in order to more fully describe the relationship of the chordal pathways to liquid accumulations in the flow meter. In particular, FIG. 3 illustrates the central passage 102, as well as the illustrative four chords A, B, C and D. The central passage has a radius R. In accordance with the various embodiments, each of the chords A, B, C and D resides above, and does not intersect the surface of a liquid 300 accumulated in the lower-most portion (in relation to gravity G) of the central passage 102. Inasmuch as the elevation in the central passage of the surface of the liquid changes based on the amount of liquid, the specification further defines that the each chord resides above and does intersect (within the central passage) a horizontal plane 302 defined at an elevation of five percent (5%) of the radius R of the central passage, as measured from the lower-most point in the central passage. In FIG. 3, each chord A, B, C and D is shown substantially horizontal (stated otherwise, parallel to the horizontal plane 302); however, the chords need not be horizontal, and any attitude of the chords may be used so long as the chords do not intersect the surface of the liquid with the central passage.

The inventors of the present specification have found that even if liquid is not directly detected (e.g., a chordal pathway reflected off the surface of the liquid), the presence of liquid may nonetheless be determined by analysis of parameters calculable based on the chordal flow velocities. In particular, the inventors have found that liquid manifests itself both in terms of the flow velocity profile, and cross-flow within the flow meter. Each of these will be discussed in turn.

As mentioned with respect to the overhead cross-sectional view of FIG. 1A, gas flow with the flow meter defines a flow velocity profile. With gas (e.g., natural gas) flowing through the central passage, the flow velocity profile takes a "bell" shape, with the highest flow velocities at the center, and lower flow velocities near the walls, as shown by the flow velocity profile 152 in the overhead view of FIG. 1A, and the flow velocity profile 400 in the side elevation view of FIG. 4A. With respect to flow velocity profile, the inventors have determined that liquid accumulations manifest themselves, at least in part, by rapid fluctuation of the flow velocity profile between more bell shaped profiles, and flatter profiles, such as the illustrative flow velocity profile 402 of FIG. 4B. In particular, over a relatively small period of time the flow velocity profile fluctuates back and forth between the more bell shaped profile, and a flatter profile, as illustrated in the progression with time "t" as shown by FIGS. 4A-4E. Stated otherwise, in the presence of liquid the measured gas flow velocity profile tends to take on the profile of a swimming jellyfish.

The fluctuations are rapid, and thus many fluctuations may occur over a measurement period; however, over a measurement period, the fluctuations tend to average to expected values, and thus have not heretofore been identified as indicative of the presence of liquid. For example, within an illustrative measurement period of one second, the flow meter may send 30 upstream and 30 downstream acoustic signals on each chord (i.e., in a one second measurement period, an acoustic signal is generated, propagated and received every 4.16 milliseconds). A flow velocity profile may be established after a complete set of acoustic signals are sent (i.e., one upstream and one downstream on each chord), or roughly every 33 milliseconds for a four chord meter. In accordance with at least some embodiments, the flow velocity profiles within a measurement period are analyzed in some fashion to determine whether fluctuations are present.

In some embodiments, particularly where the computing power of processor 202 (FIG. 2) is relatively high, the determination of whether liquid is present in the meter may be made by graphical analysis of the flow velocity profiles. In yet still other embodiments, a parameter is calculated that is indicative of the flow velocity profile for a particular set of measurements, and the parameter is analyzed against previously (or subsequently) calculated versions of the parameter (e.g., within the same measurement period) to determine whether liquid is present in the meter. In some embodiments, the standard deviation of a plurality of such parameters is taken, and if the standard deviation is above a predetermined threshold, then liquid is present in the meter. In yet still other embodiments, a magnitude of the difference between the parameter and previously calculated versions of the parameter is calculated, and if the difference is above a predetermined threshold, then liquid is present in the meter.

The parameter indicative of the flow velocity profile likewise may take many forms. In some embodiments, the parameter is a dimensionless profile factor indicative the flatness of the flow velocity profile. For a four chord flow meter, the profile factor parameter takes the form:

$$\text{Profile Factor} = \frac{V_B + V_C}{V_A + V_D} \quad (1)$$

where $V_A$ is the flow velocity at an upper most chord, $V_B$ is the flow velocity at an upper-middle chord, $V_C$ is the flow velocity at a lower-middle chord, and $V_D$ is the flow velocity at a lower most chord.

Consider, as an example, a measurement period of one second and a four chord meter. As above, the flow meter may make a complete set (all four chords) of flow velocity determinations in approximately 33 milliseconds, and from each set compute a value of the profile factor. In accordance with at least some embodiments, the standard deviation of the parameter is taken over a measurement period (e.g., approximately 30 values in a one second measurement period), and the standard deviation is compared against a predetermined value. For example, if the standard deviation of the profile factor is above 0.08, then liquid is present in the flow meter, and the flow meter thus takes further action to alert the user/owner. The further action may involve, for example, asserting an output signal to trigger a local alarm, or sending an electronic message to other devices (e.g., SCADA system) indicating that liquid is present. In alternative embodiments, a difference in magnitude of the values of the profile factor (e.g., between the largest value and the smallest value) may be determined, and compared against a predetermined values. If the difference in magnitude exceeds a predetermined value, then the flow meter takes further action to alert the user/owner. These cases are merely examples, and longer or shorter measurement periods, and correspondingly greater or fewer values, may be used in the determinations.

The flow velocity profile discussed to this point has focused on "bell shaped" flow velocity profiles, and how the bell shape fluctuates in the presence liquids; however, liquids may manifest themselves in other ways in relation to the flow velocity profile as well. In particular, the inventors of the present specification have found that the peak of the bell shape itself may alternately, and rapidly, shift away from the centerline of the central passage (known as "asymmetry"), and then shift back, in the presence of liquid in the flow meter. The shift of the peak off the center line may take place concurrently with the fluctuation of the bell shaped flow velocity profile as discussed above. In particular, in a relative small period of time the flow velocity profile may fluctuate between a centered peak, and an off-center peak, as illustrated in the progression with time "t" shown by FIGS. 5A-5E. The fluctuations are rapid, and thus many fluctuations may occur over a measurement period; however, over a measurement period, the fluctuations tend to average to expected values, and thus have not heretofore been identified as indicative of the presence of liquid.

In some embodiments, particularly where the computing power of processor 202 (FIG. 2) is relatively high, the determination of whether liquid is present in the meter may be made by graphical analysis of the flow velocity profiles, particularly the asymmetry of the flow velocity profiles. In yet still other embodiments, a parameter is calculated that is indicative of the asymmetry for a particular set of measurements, and the parameter is analyzed against previously (or subsequently) calculated versions of the parameter (e.g., within the same measurement period) to determine whether liquid is present in the meter. In some embodiments, the standard deviation is calculated based on the parameter (in relation to a plurality of previously calculated versions), and if the standard deviation is above a predetermined threshold, then liquid is present in the meter. In yet still other embodiments, a magnitude of the difference between the parameter and previously calculated versions of the parameter is calculated, and if the difference is above a predetermined threshold, then liquid is present in the meter.

In embodiments that determine the presence of liquid by calculating parameters being values indicative of asymmetry, and for four chord meters, the asymmetry parameter takes the form:

$$\text{Asymmetry} = \frac{V_A + V_B}{V_C + V_D} \quad (2)$$

where $V_A$ is the flow velocity at an upper most chord, $V_B$ is the flow velocity at an upper-middle chord, $V_C$ is the flow velocity at a lower-middle chord, and $V_D$ is the flow velocity at a lower most chord.

Consider, as an example, a measurement period of one second and a four chord meter. As above, the flow meter may make a complete set (all four chords) of flow velocity determinations in approximately 33 milliseconds, and from each set compute a value of the asymmetry. In accordance with at least some embodiments, the standard deviation of the parameter is taken over a measurement period (e.g., approximately 30 values in a one second measurement period), and the standard deviation is compared against a predetermined value. For example, if the standard deviation of the asymmetry is above 0.08, then liquid is present in the flow meter, and the flow meter thus takes further action to alert the user/owner. In alternative embodiments, a difference in magnitude of the values of the asymmetry (e.g., between the largest value and the smallest value) may be determined, and compared against a predetermined values. If the difference in magnitude exceeds a predetermined value, then the flow meter takes further action to alert the user/owner. These cases are merely examples, and longer or shorter measurement periods, and correspondingly greater or fewer values, may be used in the determinations.

In addition to, or in place of, the determination of the presence of liquid based on fluctuations in flow velocity profile, the inventors of the present specification have also found that liquids manifest themselves in the form of cross-flow within the flow meter. In particular, the flow direction of the gas in the flow meter is, in most situations, parallel to an axial center-line, or central axis, of the central passage. However, in the presence of liquid, the gas flow tends to fluctuate from flow parallel to the central axis, to flow in non-parallel directions to the central axis. The fluctuations are rapid, and thus many fluctuations may occur over a measurement period; however, over a measurement period, the fluctuations tend to average to expected values, and thus have not heretofore been identified as indicative of the presence of liquid.

In some embodiments, a parameter is calculated that is indicative of the cross-flow for a particular set of measurements, and the parameter is analyzed against previously (or subsequently) calculated versions of the parameter (e.g., within the same measurement period) to determine whether liquid is present in the meter. In some embodiments, the standard deviation of the parameter (in relation to a plurality of previously calculated versions) is taken, and if the standard deviation is above a predetermined threshold, then liquid is present in the meter. In yet still other embodiments, a magnitude of the difference between the parameter and previously calculated versions of the parameter is calculated, and if the difference is above a predetermined threshold, then liquid is present in the meter.

In embodiments that determine the presence of liquid by calculating parameters being values indicative of cross-flow, and for four chord meters, the cross-flow parameter takes the form:

$$\text{Cross Flow} = \frac{V_A + V_C}{V_B + V_D} \quad (3)$$

where $V_A$ is the flow velocity at an upper most chord, $V_B$ is the flow velocity at an upper-middle chord, $V_C$ is the flow velocity at a lower-middle chord, and $V_D$ is the flow velocity at a lower most chord.

Consider, as an example, a measurement period of one second and a four chord meter. As above, the flow meter may make a complete set (all four chords) of flow velocity determinations in approximately 33 milliseconds, and from each set compute a value of the cross-flow. In accordance with at least some embodiments, the standard deviation of the parameter is taken over a measurement period (e.g., approximately 30 values in a one second measurement period), and the standard deviation is compared against a predetermined value. For example, if the standard deviation of the cross flow is above 0.08, then liquid is present in the flow meter, and the flow meter thus takes further action to alert the user/owner. In alternative embodiments, a difference in magnitude of the values of the asymmetry (e.g., between the largest value and the smallest value) may be determined, and compared against a predetermined values. If the difference in magnitude exceeds a predetermined value, then the flow meter takes further action to alert the user/owner. These cases are merely examples, and longer or shorter measurement periods, and correspondingly greater or fewer values, may be used in the determinations.

The various embodiments discussed to this point analyze a particular parameter for the presence of liquid; however, in other embodiments the various parameters may be used in combination. For example, if the standard deviation of cross flow is higher than normal (e.g., 0.2), but still below the predetermined threshold definitively indicating the presence of liquid, one of the illustrative flow velocity profile factors (e.g., profile factor, asymmetry) may be used to verify the presence or absence of liquid. Alternatively, even if a single parameter indicates liquid (e.g., profile factor and/or asymmetry), the flow meter may verify the determination using another parameter (e.g., cross-flow). Thus, the various parameters may be used in any combination to ascertain the presence or absence of liquid in the flow meter.

Figure 6:
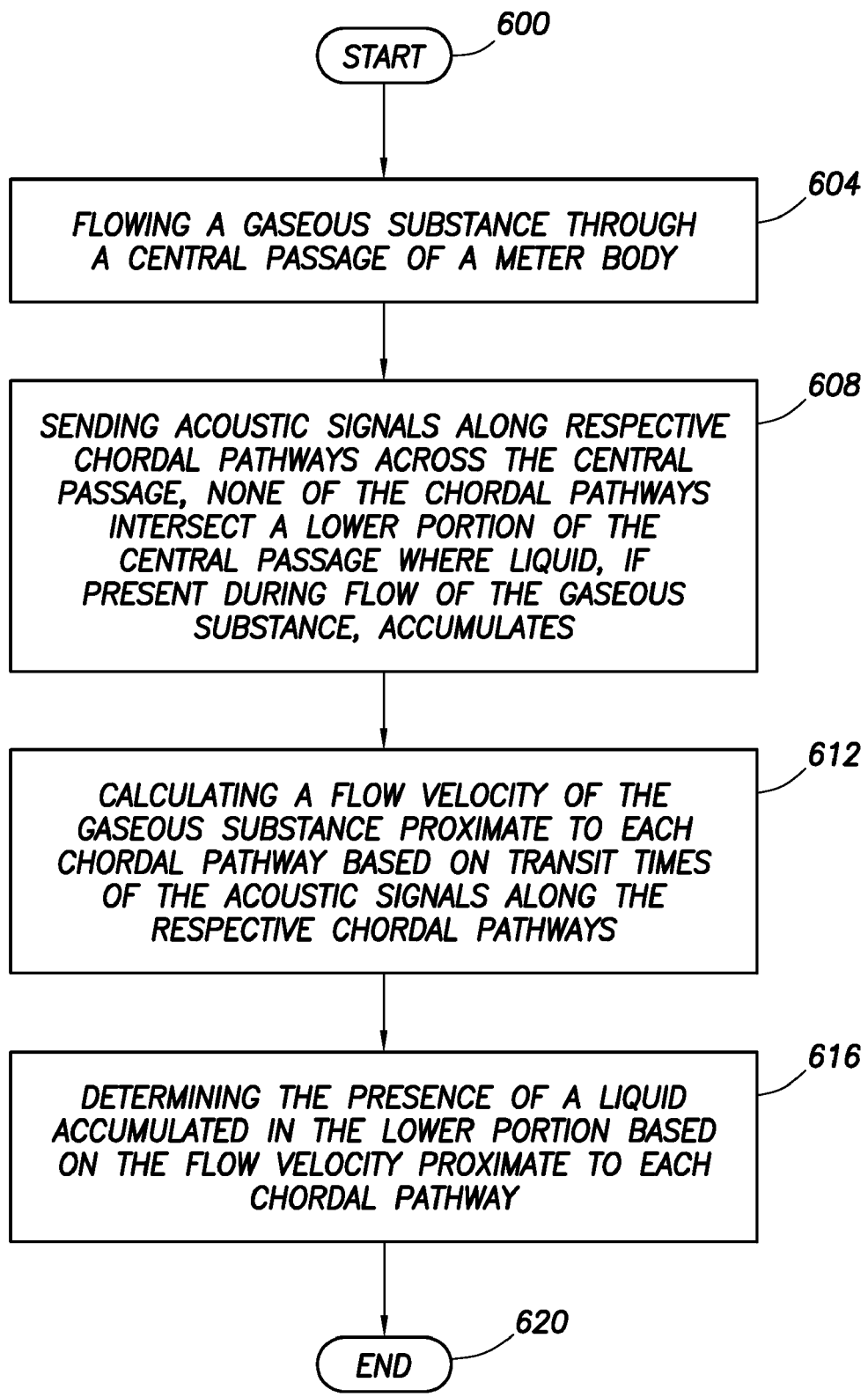
FIG. 6 shows a method in accordance with at least some embodiments.

FIG. 6 illustrates a method in accordance with at least some embodiments. In particular, the method starts (block 600) and proceeds to flowing a gaseous substance through a central passage of a meter body (block 604). For example, the gaseous substance may be hydrocarbons in the form of natural gas, but any gaseous substances may be used. The method then proceeds to sending acoustic signals along respective chordal pathways across the central passage, and none of the chordal pathways intersect a lower portion of the central passage where liquid, if present during flow of the gaseous substance, accumulates (block 608). Based on transit times of the acoustic signals along the respective chordal pathways, the method proceeds to calculating a flow velocity of the gaseous substance proximate to each chordal pathway (block 612). Then a determination is made as to the presence of a liquid accumulated in the lower portion based on the flow velocity proximate to each chordal pathway (block 616), and the method ends (block 620). The determination may take many forms. In some embodiments, a parameter indicative of the flow velocity profile (e.g., profile factor, asymmetry) is calculated and analyzed. In yet still other embodiments, a parameter indicative of the cross flow within the flow meter is calculated and analyzed.

Figure 7:
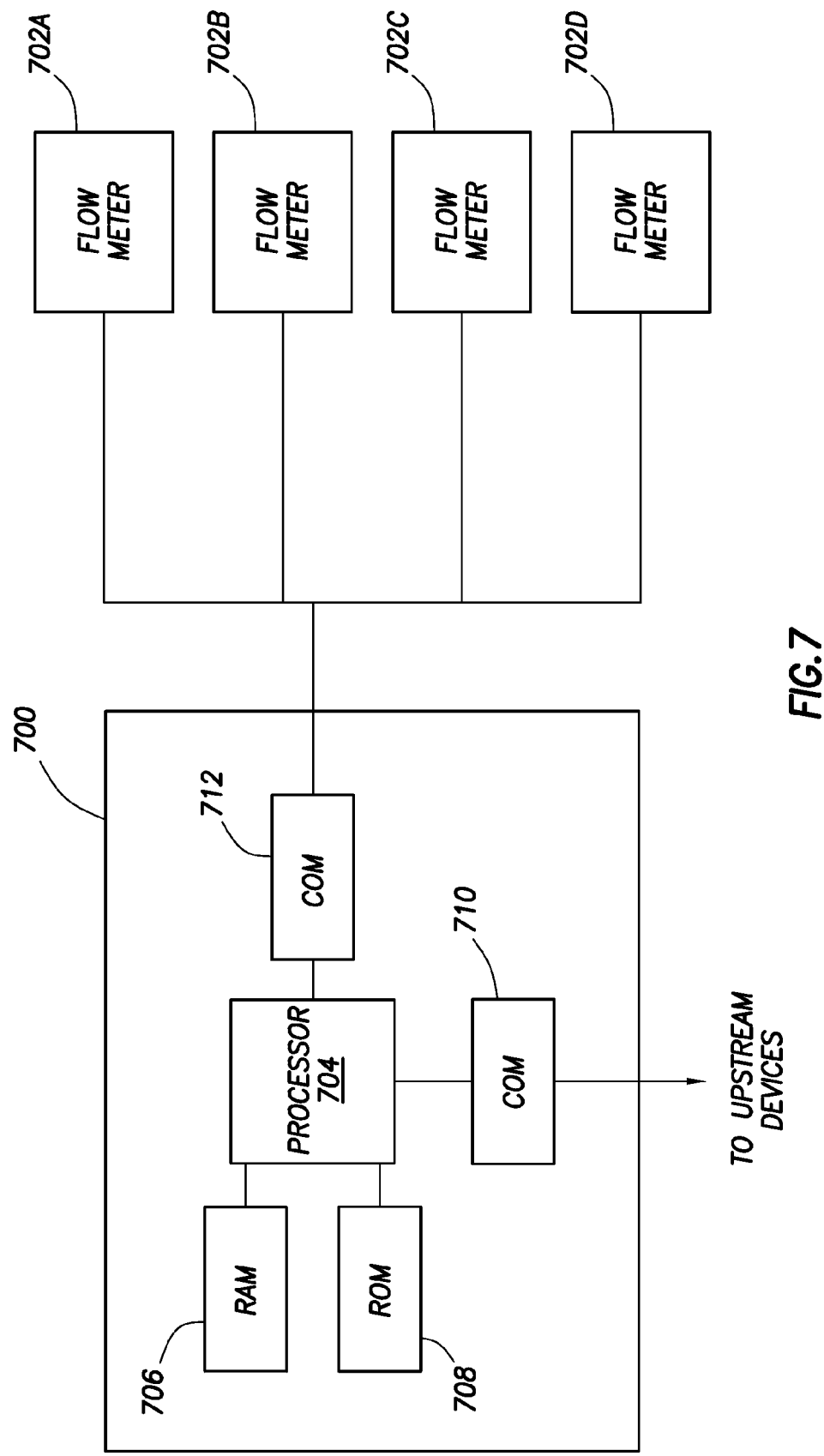
FIG. 7 shows a flow computer coupled to a plurality of flow meters in accordance with at least some embodiments.

The discussion of the specification to this point has assumed that the determination of the present of liquid takes place in the flow meter. However, in alternative embodiments the determination regarding liquid may take place in other devices coupled to the flow meter. FIG. 7 illustrates alternative embodiments where another device, communicatively coupled to the flow meter, makes the determination as to the presence or absence of liquid. In particular, FIG. 7 illustrates a flow computer 700 coupled to a plurality flow meters 702. The flow computer is configured to accumulate (i.e., maintain a running total) of fluid flow measured by each of the ultrasonic flow meters over a predetermined period of time. Each of the flow meters 702 may be constructed and operated substantially as described above. However, each meter 702 may be a different size (i.e., each spool pieces defines a central passage of a different size). For example, a natural gas meter run at a power plant may comprise a plurality of parallel and independent metering sections, each section optimized for particular range of natural gas flow rates. The flow computer 700 may thus accumulate measured gas flows from each of the flow meters 502 to establish total natural gas flow into the power plant.

The illustrative flow computer 700 comprises processor 704 coupled to a RAM 706, ROM 708, communication port 710 and communication port 712. The processor 704 is the device within which programs execute to perform the tasks of accumulating flow volume, and also determining whether liquid is present in any of the flow meters 702. The ROM 708 is a non-volatile memory which stores operating system programs, as well as programs to implement the various embodiments. The RAM 706 is the working memory for the processor 704, and before execution some programs and/or data structures may be copied from the ROM 708 to the RAM 704. In alternative embodiments, some programs and data structures may be access directly from the ROM 708. The communication port 710 is the mechanism by which the flow computer 700 communicates with upstream devices, such as a data acquisition system. Likewise, communication port 712 is the mechanism by which the flow computer 700 communicates with the flow meters 702. In alternative embodiments, the flow computer may have an individual communication port 712 for each ultrasonic flow meter 702, and in yet still other embodiments a single communication port may serve to communicate both to the ultrasonic flow meters and the upstream devices. While the processor 704, RAM 706, ROM 708 and communication ports 710, 712 are illustrated as individual devices, in alternative embodiments microcontrollers are used, which microcontrollers integrally comprise a processing core, RAM, ROM and communication ports.

In accordance with these embodiments, at least one of the flow meters 702 is configured to send data indicative of liquid accumulations in a lower portion of the gas meter. In some cases the data sent to the flow computer 700 are electronic representations of the received acoustic energy. In other cases, the data sent to the flow computer 700 are representations of the gas flow velocities proximate to each chordal pathway of the flow meter. In yet still other cases, the data sent to the flow computer 700 are parameters indicative of the flow velocity profile within the flow meter. Correspondingly, the flow computer 700, and particularly the processor 704 and communication port 712, is configured to receive the data. In accordance the illustrative embodiments, the flow computer 700 is configured to determine whether liquid is present in the associated flow meter using any of the techniques described above. Thus, if a flow meter has insufficient computing power to perform the calculations to determine whether liquid is present, the computations may be performed by the flow computer to which the meter couples.

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    flowing a gaseous substance through a central passage of a meter body;
    sending acoustic signals along respective chordal pathways across the central passage, none of the chordal pathways intersect a lower portion of the central passage where liquid, if present during flow of the gaseous substance, accumulates;
    calculating a flow velocity of the gaseous substance proximate to each chordal pathway based on transit times of the acoustic signals along the respective chordal pathways; and
    determining the presence of a liquid accumulated in the lower portion based on the flow velocity proximate to each chordal pathway, wherein determining further comprises
        calculating a parameter indicative of a flow velocity profile of the gaseous substance; and
        calculating a standard deviation using the parameter and a plurality of previously calculated versions of the parameter; and
        indicating the presence of the liquid when the standard deviation is above a predetermined threshold.

2. A method comprising:
    flowing a gaseous substance through a central passage of a meter body;
    sending acoustic signals along respective chordal pathways across the central passage, none of the chordal pathways intersect a lower portion of the central passage where liquid, if present during flow of the gaseous substance, accumulates;
    calculating a flow velocity of the gaseous substance proximate to each chordal pathway based on transit times of the acoustic signals along the respective chordal pathways; and
    determining the presence of a liquid accumulated in the lower portion based on the flow velocity proximate to each chordal pathway, the determining by
        calculating a parameter indicative flow velocity of the gaseous substance at non-parallel directions to a central axis of the flow pathway;
        calculating a standard deviation using the parameter and a plurality of previously calculated versions of the parameter; and
        indicating the presence of the liquid when the standard deviation is above a predetermined threshold.

3. A system comprising:
    a meter body that defines a central passage with a radius, the meter body configured to couple to a flow of a gas such that the gas flows through the central passage;
    a plurality of transducer pairs mechanically coupled to the meter body, each transducer pair defines a chord across the central passage, each transducer pair configured to propagate and receive acoustic signals along respective chords, and each chord resides above and does not intersect within the central passage a horizontal plane at an elevation of five percent of the radius measured from a lower-most point in the central passage;
    a processor electrically coupled to the plurality of transducer pairs;
    a memory device electrically coupled to the processor, the memory device stores a program executable by the process;
    the program, when executed by the processor, causes the processor to obtain representations of received acoustic signals and to determine a flow velocity of a gas proximate to each chord based on the received acoustic signals; and
    the program further causes the processor to determine whether liquid has accumulated at the lower-most point of the central passage based on the flow velocities by causing the processor to
        calculate a parameter indicative of a flow velocity profile of the gas in the central passage; and
        calculate a standard deviation based on the parameter and a plurality of previously calculated versions of the parameter; and assert an alarm that indicates the presence of liquid when the standard deviation is above a predetermined threshold.

4. The system of claim 3 wherein when the processor analyzes, the program causes the processor to calculate a magnitude of a difference between the parameter and one or more previously calculated versions of the parameter, and to assert an alarm that indicates the presence of liquid when the magnitude of the difference is above a predetermined threshold.

5. The system of claim 3 wherein when the processor determines whether liquid has accumulated, the program causes the processor to calculate a parameter indicative flow velocity of the gas at non-parallel directions to a central axis of the central passage, and to analyze the parameter in relation to one or more previously calculated versions of the parameter.

6. A system comprising:
a meter body that defines a central passage with a radius, the meter body configured to couple to a flow of a gas such that the gas flows through the central passage;
a plurality of transducer pairs mechanically coupled to the meter body, each transducer pair defines a chord across the central passage, each transducer pair configured to propagate and receive acoustic signals along respective chords, and each chord resides above and does not intersect within the central passage a horizontal plane at an elevation of five percent of the radius measured from a lower-most point in the central passage;
a processor electrically coupled to the plurality of transducer pairs;
a memory device electrically coupled to the processor, the memory device stores a program executable by the process;
the program, when executed by the processor, causes the processor to obtain representations of received acoustic signals and to determine a flow velocity of a gas proximate to each chord based on the received acoustic signals; and
the program further causes the processor to determine whether liquid has accumulated at the lower-most point of the central passage based on the flow velocities, by causing the processor to
calculate a parameter indicative flow velocity of the gas at non-parallel directions to a central axis of the central passage;
calculate a standard deviation based on the parameter and a plurality of previously calculated versions of the parameter; and
indicate the presence of the liquid when the standard deviation is above a predetermined threshold.

7. A non-transitory computer-readable storage medium storing a program that, when executed by a processor, causes the processor to:
obtain representations of acoustic signals propagated along chords in a flow meter;
determine a flow velocity of a gas proximate to each chord based on the representations of the acoustic signals; and
determine whether liquid has accumulated at a lower-most point of a central passage based of the flow meter based on the flow velocities;
wherein when the processor determines whether liquid has accumulated, the program causes the processor to:
calculate a parameter indicative of a flow velocity profile of the gas in the central passage; and
calculate a standard deviation based on the parameter and a plurality of previously calculated versions of the parameter; and
assert an alarm that indicates the presence of liquid when the standard deviation is above a predetermined threshold.

8. A non-transitory computer-readable storage medium storing a program that, when executed by a processor, causes the processor to:
obtain representations of acoustic signals propagated along chords in a flow meter;
determine a flow velocity of a gas proximate to each chord based on the representations of the acoustic signals; and
determine whether liquid has accumulated at a lower-most point of a central passage based of the flow meter based on the flow velocities;
wherein when the processor determines whether liquid has accumulated, the program causes the processor to:
calculate a parameter indicative of a flow velocity profile of the gas in the central passage using substantially the following equation:

$$\text{Profile Factor} = \frac{V_B + V_C}{V_A + V_D}$$

where $V_A$ is the flow velocity at an upper most chord, $V_B$ is the flow velocity at an upper-middle chord, $V_C$ is the flow velocity at a lower-middle chord, and $V_D$ is the flow velocity at a lower most chord; and
analyze the parameter in relation to one or more previously calculated versions of the parameter.

9. A non-transitory computer-readable storage medium storing a program that, when executed by a processor, causes the processor to:
obtain representations of acoustic signals propagated along chords in a flow meter;
determine a flow velocity of a gas proximate to each chord based on the representations of the acoustic signals; and
determine whether liquid has accumulated at a lower-most point of a central passage based of the flow meter based on the flow velocities;
wherein when the processor determines whether liquid has accumulated, the program causes the processor to:
calculate a parameter indicative of a flow velocity profile of the gas in the central passage using substantially the following equation:

$$\text{Asymmetry} = \frac{V_A + V_B}{V_C + V_D}$$

where $V_A$ is the flow velocity at an upper most chord, $V_B$ is the flow velocity at an upper middle chord, $V_C$ is the flow velocity at a lower middle chord, and $V_D$ is the flow velocity at a lower most chord; and
analyze the parameter in relation to one or more previously calculated versions of the parameter.

10. A non-transitory computer-readable storage medium storing a program that, when executed by a processor, causes the processor to:
obtain representations of acoustic signals propagated along chords in a flow meter;
determine a flow velocity of a gas proximate to each chord based on the representations of the acoustic signals; and determine whether liquid has accumulated at a lower-most point of a central passage based of the flow meter based on the flow velocities;

wherein when the processor determines whether liquid has accumulated, the program causes the processor to
calculate a parameter indicative flow velocity of the gas at non-parallel directions to a central axis of the central passage; and
calculate a standard deviation based on the parameter and a plurality of previously calculated versions of the parameter; and
indicate the presence of the liquid when the standard deviation is above a predetermined threshold.

11. A non-transitory computer-readable storage medium storing a program that, when executed by a processor, causes the processor to:
obtain representations of acoustic signals propagated along chords in a flow meter;
determine a flow velocity of a gas proximate to each chord based on the representations of the acoustic signals; and
determine whether liquid has accumulated at a lower-most point of a central passage based of the flow meter based on the flow velocities;
wherein when the processor determines whether liquid has accumulated, the program causes the processor to
calculate a parameter indicative flow velocity of the gas at non-parallel directions to a central axis of the central passage using substantially the following equation:

$$\text{Cross Flow} = \frac{V_A + V_C}{V_B + V_D}$$

where $V_A$ is the flow velocity at an upper most chordal pathway, $V_B$ is the flow velocity at an upper middle chordal pathway, $V_C$ is the flow velocity at a lower middle chordal pathway, and $V_D$ is the flow velocity at a lower most chordal pathway; and
analyze the parameter in relation to one or more previously calculated versions of the parameter.

* * * * *